Figure 1:
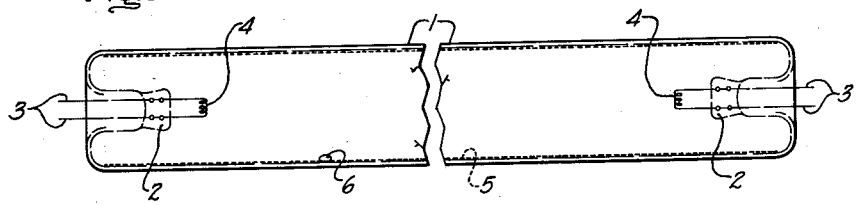

Oct. 5, 1948.  J. H. GISOLF ET AL  2,450,548

ERYTHEMAL PHOSPHOR

Filed Feb. 26, 1943

Inventors:
Jacob H. Gisolf,
Ferdinand A. Kröger,
Jan Bakker,
by John H. Anderson
Their Attorney.

Patented Oct. 5, 1948

2,450,548

UNITED STATES PATENT OFFICE 2,450,548

ERYTHEMAL PHOSPHOR

Jacob H. Gisolf, Ferdinand A. Kröger, and Jan Bakker, Eindhoven, Netherlands, assignors to General Electric Company, Inc., Schenectady, N. Y.

Application February 26, 1943, Serial No. 477,327
In the Netherlands June 16, 1941

Section 1, Public Law 690, August 8, 1946
Patent expires June 16, 1961

4 Claims. (Cl. 176—122)

For various purposes, there is need of a source or generator of ultraviolet radiation of a wavelength of some 2700 to 3000 Å., about the erythemal range, which may be accompanied by radiation of wavelength from 3000 to 4000 Å. The present invention has for its aim a source of ultraviolet radiation affording a continuous spectrum in the range of 2700 to 3000 Å., and the production of this radiation at high efficiency. According to the invention, a luminescent material or phosphor is used which under the impact of radiation of certain wave lengths emits resulting radiation of other wavelengths.

The source of radiation consists, according to the invention, of an electric gaseous discharge tube and a fluorescent layer comprising cerium fluoride in which cerium is present in the trivalent form, and hereinafter where cerium fluoride is mentioned, cerium fluoride containing trivalent cerium is meant. It has been found that cerium fluoride affords a means of producing or generating, by fluorescence, ultraviolet radiation in the wavelength range of 2700 to 3000 Å. The fluorescent layer need not consist entirely of cerium fluoride, but may contain other materials. Indeed, it is advantageous to employ the cerium fluoride in solid solution with compounds, especially fluoride, of metals in the third and fourth groups of the periodic system, and particularly with one or more fluorides of yttrium, lanthanum, aluminum, thorium, zirconium, hafnium, and the other rare earths, or with double fluorides containing one or more of these as components. Thus a higher output is obtained, and also a change in the spectral distribution in the range in question; so that it becomes possible to select a fluorescent layer which gives a very high output in a particular part of the wavelength range. It is to be remarked, in this connection, that a solid solution of cerium fluoride in one or more of the aforementioned fluorides is regarded as a material "containing cerium fluoride" as referred to above.

Especially good results have been obtained from fluorescent layers of lanthanum fluoride with from 0.01 per cent to 10 per cent cerium fluoride, or of aluminum fluoride with 0.01 per cent to 5 per cent cerium fluoride.

In the composition of the fluorescent layer, care is to be taken that the disturbing or unproductive (storende) absorption of radiation impinging on the cerium fluoride (i. e., absorption which does not give rise to fluorescence) and of the fluorescent radiation itself is as small as possible. This applies especially when fluorides or double fluorides of rare earth metals are used.

As a rule, the fluorescent layer will be put on the inside of the discharge tube wall; and in this case the wall should be of a material that freely passes ultraviolet radiation having a wavelength greater than 2700 Å., but effectively absorbs radiation of wavelength less than 2700 Å. But it is also possible to place the fluorescent layer differently. For example, the discharge tube proper may be of quartz and may be enclosed in an outer tube, while the fluorescent material is advantageously put on the inner side of the outer tube wall. In this case, the outer tube must have the same transmitting properties as were stated above for the discharge tube wall. Instead of being put on an outer tube, the fluorescent material can be placed on a reflector so mounted that it is struck by the radiation produced by the discharge tube. However, as it is generally not desirable that the radiation from the apparatus should include any radiation of a wavelength less than 2700 Å., the reflector is preferably closed off with a glass that effectively absorbs this radiation while freely passing that of a wavelength greater than 2700 Å.

The gaseous atmosphere of the discharge tube, whether consisting of one or more gases, or of one or more vapors, or of a gas and vapor mixture, must of course be so chosen that the radiation produced by the discharge through this atmosphere can bring the aforesaid fluorescent material to fluorescence. The fluorescent material is, in fact, excited by radiation with a wavelength less than 2700 Å. Preferably the discharge tube is provided with a gas and mercury vapor filling, thus becoming a so-called low pressure mercury vapor discharge tube in which the fluorescent material is excited largely by the 2537 Å. resonance radiation of mercury. However, other fillings can be employed, as for example a filling of rare gas or of the vapors of zinc, cadmium, arsenic or of mixtures thereof.

Figure 2:
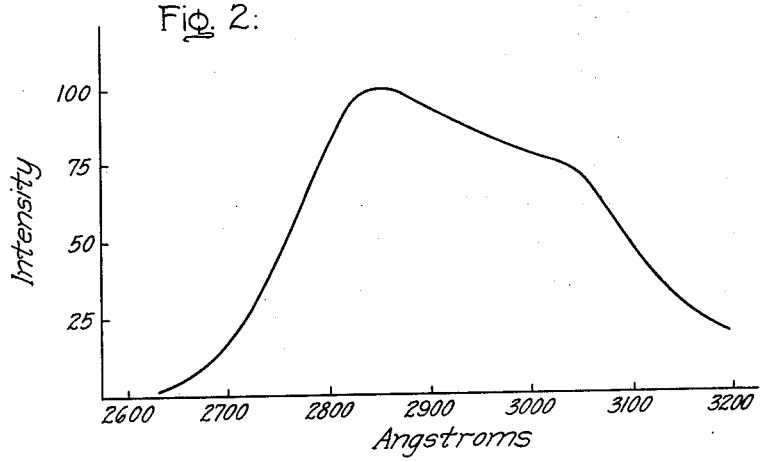

In the drawings, Fig. 1 is a schematic side view of an electric discharge tube for producing radiation according to the invention; and Fig. 2 shows a curve representing the relative intensity of the radiation from such a tube in the range of wavelengths from about 2600 Å. to 3200 Å., which is about the erythemal range.

The invention will be further explained in connection with the drawing, in which Fig. 1 schematically represents a source of radiation according to the invention. In this figure, 1 is the wall of a gaseous discharge tube. At either end of this tube is the seal press 2 of a stem tube through which the current leads 3 of the electrodes 4 extend. These electrodes or cathodes may consist of tungsten wire filament coils coated with activating alkaline earth oxide, such as a mixture of barium and strontium oxides, and may be preheated for starting by passage of current through them, according to the usual practice with ordinary low pressure positive column fluorescent lamps. On the internal surface of the tube wall is coated a fluorescent layer 5, consisting of lanthanum fluoride containing about 0.5 per cent cerium fluoride, or of aluminum fluoride with about 2½ per cent cerium fluoride. The tube is filled with starting gas such as a rare gas like argon at a pressure of a few millimeters of mercury, and mercury (indicated by a droplet 6) is also put in the tube. In operation, the tube shows a diffuse low pressure mercury vapor discharge, with a vapor pressure lying between 0.1 and 0.001 millimeter of mercury, preferably about 0.01 millimeter.

The discharge tube is simple in construction and convenient to use, having the advantage that it operates at full current directly after it is started, while after extinction of the discharge, the tube can be restarted immediately. The heat developed in the discharge is low, while the output is good.

Fig. 2 of the drawing shows the emission curve of energy as a function of the wavelength for lanthanum fluoride with 0.5 per cent cerium fluoride applied to the inside of the low pressure mercury vapor discharge tube made of quartz.

What we claim as new and desire to secure by Letters Patent of the United States is:

1. A phosphor comprising cerium fluoride in solid solution in fluoride of metal of the group consisting of aluminum, thorium, zirconium, hafnium, and the rare earth metals.

2. A phosphor comprising lanthanum fluoride containing from .01 to 10 per cent of cerium fluoride.

3. A phosphor comprising aluminum fluoride containing .01 per cent to 5 per cent of cerium fluoride.

4. An ultraviolet generator embodying a source of short-wave ultraviolet radiation and a fluorescent layer comprising cerium fluoride in which the cerium is present in trivalent form and characterized by resulting radiation in the erythemal ultraviolet when excited by the short-wave ultraviolet radiation.

JACOB HENDRIK GISOLF.
FERDINAND ANNE KRÖGER.
JAN BAKKER.

REFERENCES CITED

The following references are of record in the file of this patent:

UNITED STATES PATENTS

| Number | Name | Date |
|---|---|---|
| 2,049,765 | Fisher | Aug. 4, 1936 |
| 2,176,100 | Pfanstiehl | Oct. 17, 1939 |
| 2,254,956 | Aschermann | Sept. 2, 1941 |
| 2,312,266 | Roberts | Feb. 23, 1943 |

FOREIGN PATENTS

| Number | Country | Date |
|---|---|---|
| 59,231 | Holland | June 5, 1941 |
| 387,130 | Great Britain | Feb. 2, 1933 |

OTHER REFERENCES

"The Nature of Spectral Diffuse Emission of Solutions of Rare Earth Salts," by A. A. Shishlovskii in Acta Physiocochim, U. R. S. S. 17, 1935–51 (1942) in English (same as the above abstract citation).

Z. Anorg. Allgem. Chem. 244, 337–47 (1940). (Copy in Sci. Library of Patent Office.)

Mellor, "Comprehensive Treatise on Inorganic and Theoretical Chem.," vol. 5, pp. 637–638. (Copy in Div. 59.)

Chem. Abs., 37, 4628. (Copy in Div. 6.)

Chemistry of Rarer Elements by Hopkins, pub. D. C. Heath & Co., 1923, page 176. (Copy in Div. 59.)

Mellor Inorganic Chemistry, vol. 3, pages 637–638, pub. Longmans Green & Co., N. Y. (Copy in Div. 59.)